Dec. 9, 1969   M. J. BLICKSTEIN ET AL   3,483,450
AIR DIELECTRIC ADJUSTABLE CAPACITOR
Filed Feb. 8, 1968   2 Sheets-Sheet 2
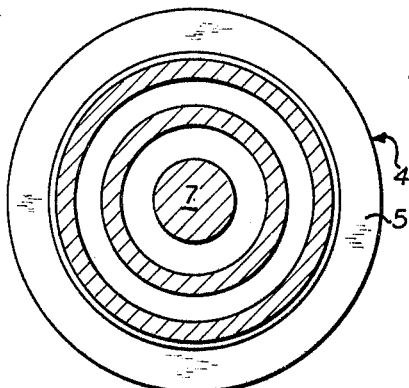
FIG. 4.
FIG. 5.
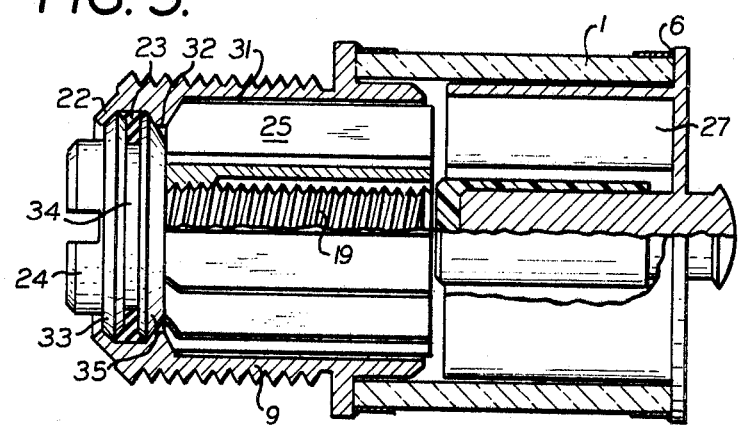
FIG. 6.
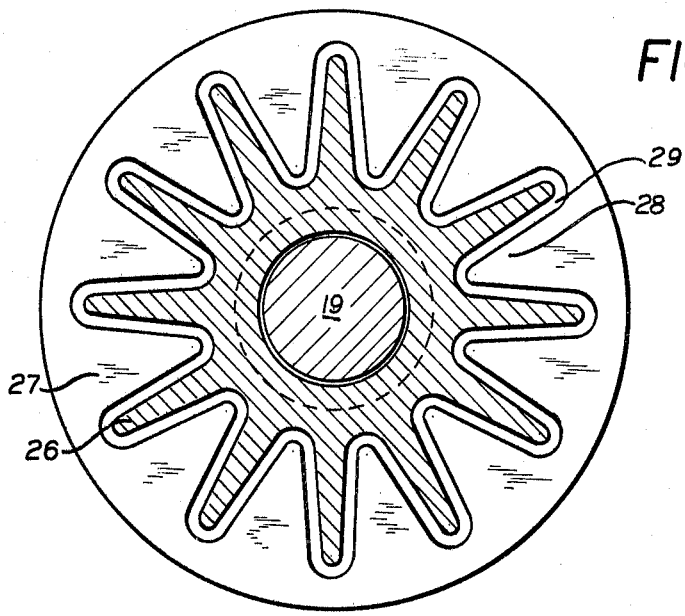
INVENTORS
MARTIN J. BLICKSTEIN
MARTIN A. MITTLER
BY:
Burgess, Dinklage & Sprung
ATTORNEYS.

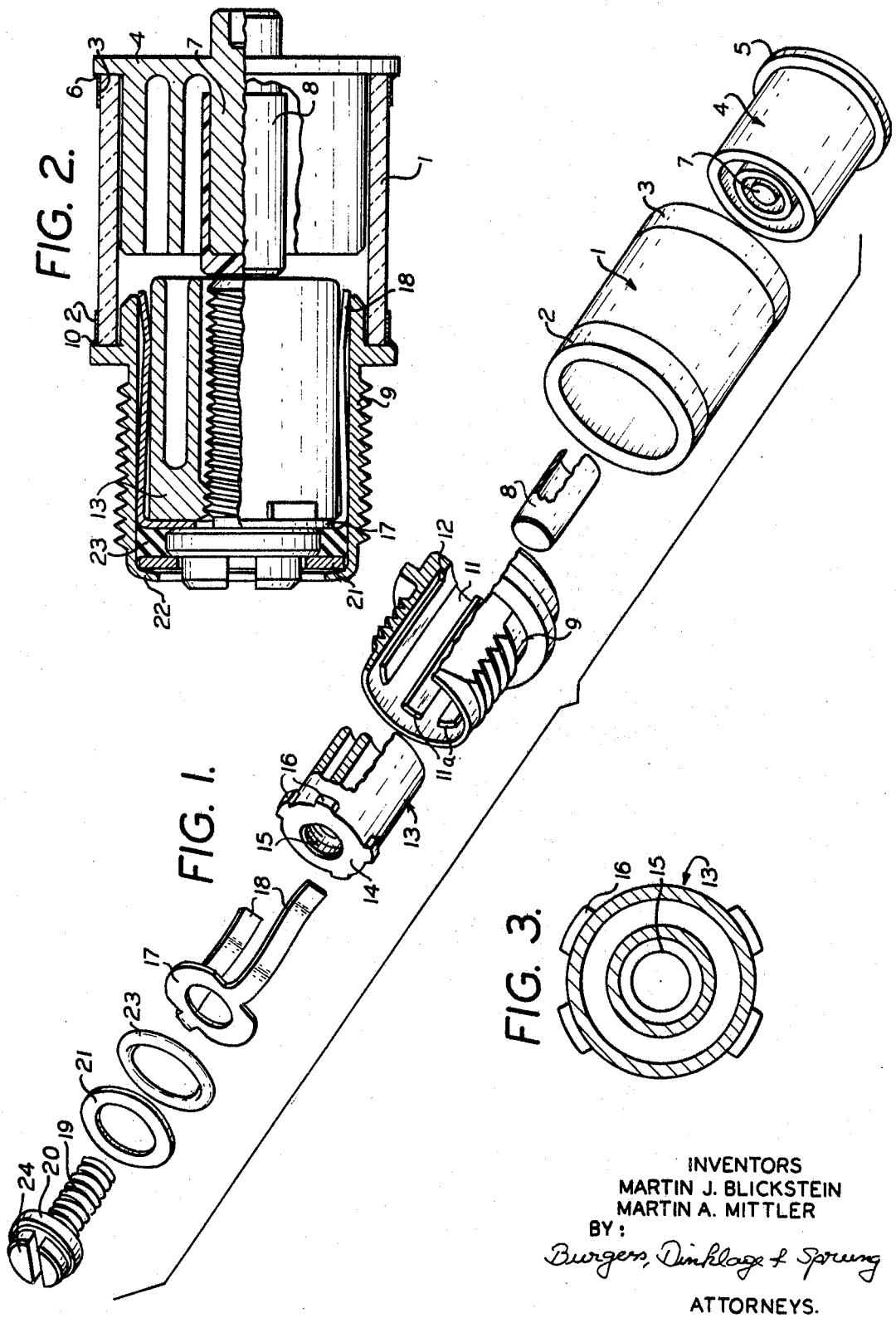

United States Patent Office 3,483,450
Patented Dec. 9, 1969

3,483,450
AIR DIELECTRIC ADJUSTABLE CAPACITOR
Martin J. Blickstein, Caldwell, and Martin A. Mittler, Parsippany, N.J., assignors to Voltronics Corporation, Hanover, N.J., a corporation of New Jersey
Filed Feb. 8, 1968, Ser. No. 703,984
Int. Cl. H01g 5/14
U.S. Cl. 317—251                          19 Claims

ABSTRACT OF THE DISCLOSURE

Air dielectric adjustable capacitor with a tubular housing of insulating material and a tubular bushing. A drive screw is rotatably captured in the bushing for driving an adjustable capacitor plate. Guide means are provided in the bushing which allows sliding of the adjustable plate when the drive screw is rotated.

---

This invention relates to an air dielectric adjustable capacitor and preferably one which may be constructed in miniature form.

Miniature air dielectric adjustable capacitors which are used, for example, as trimmer capacitors are known. According to one known construction, the capacitor is provided with a stator plate in the form of concentric tubes and a rotor plate also in the form of concentric tubes capable of interleaving or nesting concentrically within the stator plates. The stator is positioned at one end of a housing and the rotor screws into the housing by means of external threads at its outer end which mate the corresponding threads on the inner wall of the housing. The capacitance is adjusted by the degree that the rotor is screwed into the housing and thus the degree of overlap with the stator plates. The parts for this capacitor must be machined to extremely close tolerance and its construction is extremely difficult and exacting.

One object of this invention is an improved design for a miniature adjustable air dielectric capacitor which may be much more easily and reliably constructed and which overcomes many of the disadvantages of the prior known devices. This and still further objects will become apparent from the following description read in conjunction with the drawings in which:

FIG. 1 is an exploded perspective view of an embodiment of a capacitor in accordance with the invention, FIG. 2 is a vertical section of the capacitor shown in FIG. 1, FIG. 3 is a cross section of the adjustable plate of the embodiment shown in FIG. 2, FIG. 4 is a further cross section of the stator plate of the embodiment shown in FIG. 2, FIG. 5 is a longitudinal cross section of a further embodiment of the capacitor in accordance with the invention, and FIG. 6 is a cross section of the embodiment shown in FIG. 5.

The capacitor in accordance with the invention has a tubular housing with a stator capacitor plate positioned therein. While this plate may have any cross-sectional shape, the same preferably has a symmetrical cross-sectional shape of large surface area and is most preferably in the form of concentric tubular sleeves. The housing preferably has its outer cylindrical wall constructed of electrically insulating material.

A bushing, which is also preferably tubular, forms an extension of the housing. The bushing is preferably metal, and has a drive screw extending axially into the interior thereof. The drive screw is preferably rotatably captured by means of a washer and sealing arrangement in the end of the bushing. An adjustable capacitor plate is positioned in the bushing in threaded engagement with the drive screw so that, upon rotation of the drive screw, the adjustable capacitor plate will slide without rotation between a retracted position in the bushing and an extended position in the housing nested with the stator capacitor plate with a dielectric gap therebetween. The adjustable capacitor plate should thus have a mating corresponding cross-sectional shape to that of the stator plate, but of the size to leave an air gap between the surfaces of the two plates when nested. Thus, when the stator plate is in its preferred form of concentric tubular sleeves, the adjustable capacitor plate is also in the form of concentric tubular sleeves which concentrically slide in spaced relation between the sleeves forming the stator. Guide means are provided for allowing sliding of the adjustable capacitor plate between its positions without rotation. These guide means are preferably in the form of axially extending slots along the inner surface of the bushing, and projections or lands on the rotor which extend in sliding engagement with these slots. These stator and adjustable plates are electrically insulated from each other and separate external electrical connections are provided for these plates. Preferably, the adjustable capacitor plate is maintained in conductive connection with the bushing by means of a washer provided with spring arms which maintains contact between the adjustable plate and the bushing so that connection may be directly made with the bushing. The adjustable plate is insulated from the stator plate and the other connection is made at the end of the stator plate or through an electrical lead from the stator plate external of the insulated housing wall. The drive screw is preferably externally adjustable by means of a conventional slotted head accessible through the end of the bushing. Upon rotation of the drive screw, the adjustable plate will be slidably moved between its positions to adjust the capacitance. Preferably, a plastic guide spacer is centrally positioned within the stator plate to maintain the adjustable plate in axial alignment therewith during its motion.

Referring to the embodiment shown in FIGS. 1 to 4, of the drawings, 1 represents a cylindrical housing of insulating material, such as ceramic, which is metallized at its ends 2 and 3. Positioned within this housing is the stator capacitor plate 4 which is formed of the concentric cylindrical sleeves extending from the end plate 5. The entire unit may be precision die-cast of metal, as for example, zinc. The stator through the end plate 5 is in contact with the metallized end 3 of the housing 1 and may be soldered in place at 6. The center of the stator is in the form of a slide post 7 on which is positioned the plastic guide bushing 8. A metal bushing 9 which may also be precision die-cast is secured to the other end of the housing 1 as, for example, by soldering at 10 to the metallized portion 2. The bushing 9 thus forms an extension of the housing. The interior of the bushing is provided with the longitudinally extending guide slots 11. All but two opposed of these guide slots do not extend entirely through the bushing and are provided with the blind end shoulders 12. An adjustable capacitor plate 13 is provided for sliding actuation within the bushing 9. The adjustable plate 13 is in the form of a number of concentric cylindrical sleeves which can nest concentrically within the sleeves forming the stator 4 with an air space therebetween. The adjustable plate 13 may also be precision die-cast of metal and provided with the integrally cast end portion 14 so that the same is in the form of an open-ended cylinder in the same manner as the stator 4. The end 14 is axially drilled and tapped with threads at 15. The end 14 is furthermore provided with guide extensions or lands 16, which engage in the guide slots 11 to allow sliding of these slots without rotation. A spring washer 17 which is provided with the spring contact arms 18 extend in the slots 11 which extend entirely through the bushing 9. The end of the bushing 9 is provided with an annular cut-out which forms the shoulders 11a between the slots 11. Movement of the spring washer 17 toward the stator 4 is prevented by the spring washer being seated against these shoulders 11a. Movement in the opposite direction is prevented by the washer 21 and turn edge 22 as hereinafter described. Spring washer 17 is preferably of beryllium copper and the contact arms 18 are preferably bent as shown so as to ensure sliding contact with the adjustable plate 13 and also to be maintained in electrical contact with the inner wall of the bushing 9. A drive screw 19 extends coaxially into the bushing 9. The end of the drive screw 19 is provided with an enlarged head or flange 20 which engages the washer 17 in order to prevent axial movement of the drive screw toward the housing end. The outer end of the flange 20 engages the washer 21 which is held in place by the turned-in edge or lip 22 of the end of the housing. A sealing ring 23 surrounds the flange 20 in order to provide sealing between the flange 20 and the bushing 9. The drive screw is provided with a conventional slotted head 24 for rotation with a screw driver. The drive screw is thus rotatably captured in the bushing and with the sealing ring 23 forms a rotating seal, sealing the end of the housing and the entire interior of the unit. An electrical contact for the stator may be secured to the end 5, and an electrical contact for the rotor may be secured to the bushing 9 or the wall of this bushing may form this contact.

The operation capacitance is established between the adjustable plate 13 and stator plate, as, for example, by an electrical connection between the bushing 9 and an electrical connection to the end 5, and may be adjusted by inserting a screw driver in the head 24 and rotating the drive screw. The shoulders 12 establish a positive stop for the adjustable plate 13 in its extended position, providing a positive maximum capacitance. The spring washer 17 provides a positive stop for the adjustable capacitor plate 13 in its retracted position establishing the minimum capacitance value. The threaded portion 15 of the rotor is threaded on the threads of the drive screw 19, so that as the drive screw rotates, the adjustable plate 13 will slide without rotation from its retracted position as shown in FIG. 2 to an extended position nested in the stator 4 with the air dielectric therebetween. The capacitance is, of course, varied by the degree of overlap between the plates. The plastic guide bushing 8 helps to maintain concentric alignment.

The capacitor is completely sealed by the sealing ring 23 which may be an O-ring or flat washer. The lip 22 may be compressed, for example, by spinning. As the drive screw and screw head 24 rotate without axial movement, tuning adjustment is facilitated. Furthermore, the amount of travel of the adjustable plate for a given size capacitor is substantially increased and in most cases doubled over the conventional devices.

While the stator and adjustable capacitor plates are preferably in the form of the cylindrical sleeves which concentrically interleave and nest together, the same may also take any other form which can so nest together in spaced relationship with the dielectric air gap therebetween. Preferably, these plates should be constructed so as to present a maximum surface area while at the same time facilitating fabrication.

While the gap between the adjustable capacitor plate and the stator capacitor plate constitutes the dielectric, one or both of these plates may additionally be coated with a thin coating of dielectric material, such as a plastic dielectric material. Thus, for example, the inside of the stator may be coated with a very thin coating of an in-insulation such as Paralene. This coating will positively eliminate any dust shorting out of the plate, will raise the voltage rating, and will raise the capacitance range slightly.

The embodiment as shown in FIGS. 5 and 6 is identical to the previously described embodiment, except with respect to the shape of the stator plate and the adjustable plate. As shown in this embodiment, the adjustable capacitor plate which is designated 25 has a symmetrical cross section with a multiple number of radiating longitudinal ribs 26. The stator plate 27 has a corresponding female form with the inwardly directed ribs 28 which form the channels 29 into which the ribs 26 of the adjustable plate 25 extend in spaced relationship. Inward axial movement of the drive screw 19 is prevented by means of a shoulder 32 and by providing the drive screw 19 with, in place of the flange 20, a flange 33 provided with the groove 34 and stepped flange portion 35, which engages the shoulder 32.

In all other respects, construction and operation is identical with that described in connection with the previous embodiment.

The seal provided by the gasket 23 and groove 34 may be made pressure-tight and the interior of the capacitor evacuated to form a vacuum capacitor. In forming such a type of capacitor, any other type of rotary hermetic seal may, of course, be used.

The parts for the capacitor in accordance with the invention may be very simply made by precision die-casting, and thus the overall cost of the device is substantially reduced while at the same time the reliability is increased.

While the invention has been described in detail with reference to certain specific embodiments, various changes and modifications which fall within the spirit of the invention and scope of the appended claims will become apparent to the skilled artisan. The invention is thus only intended to be limited by the appended claims or their equivalents wherein we have endeavored to claim all inherent novelty.

We claim:
1. Adjustable capacitor comprising a tubular housing having a stator capacitor plate positioned therein, a bushing forming an extension of said tubular housing, a drive screw rotatably extending into the interior of said bushing, an adjustable capacitor plate positioned in said bushing in threaded engagement with said drive screw and movable between a retracted position in said bushing and an extended position in said housing nested with said stator capacitor plate with a dielectric air gap therebetween, guide grooves axially extending along the inner wall of said bushing, lands on the end portion of the outer wall of said adjustable capacitor plate mating with said grooves allowing sliding of said adjustable capacitor plate between said positions without rotation, a shoulder at the end of at least one of said grooves for contact with a land to act as a positive stop for said adjustable capacitor plate in its extended position, separate means for establishing external electrical connection to said stator and adjustable capacitor plates, and means for externally rotating said drive screw to thereby slide said adjustable plate relative to said stator plate without rotation to thereby vary the capacitance therebetween.

2. Adjustable capacitor according to claim 1 in which said stator and adjustable capacitor plates are concentrically positioned tubular plates.

3. Adjustable capacitor according to claim 2 in which said stator capacitor plate comprises a plurality of concentric tubular plates and in which said adjustable capacitor plate comprises a plurality of concentric tubular plates concentrically slidable between said stator capacitor plates in spaced relationship thereto.

4. Adjustable capacitor according to claim 1 in which said drive screw is rotatably captured in said bushing with the head thereof externally accessible as said means of externally rotating said drive screw.

5. Adjustable capacitor according to claim 1 in which said electrical connection means for said adjustable capacitor plate includes a spring washer in said bushing with contact arms extending in contact with said adjustable capacitor plate.

6. Adjustable capacitor comprising:
 (a) A tubular housing having a wall portion of electric insulating material,
 (b) a stator capacitor plate in the form of a plurality of concentric tubular members positioned in said housing,
 (c) a tubular housing forming an extension of said housing,
 (d) a drive screw extending centrally axially into the interior of said bushing and rotatably externally therefrom,
 (e) an adjustable capacitor plate in the form of a plurality of concentric tubular members positioned in said bushing in threaded engagement with said drive screw for sliding actuation upon rotation of said drive screw between a retracted position in said bushing and an extended position in said housing nested with said stator plate with its tubular members in alternate spaced concentric relationship to the tubular members forming said stator plate,
 (f) guide grooves axially extending along the inner wall of said bushing, lands on the end portion of the outer wall of said adjustable capacitor plate mating said grooves to allow sliding of said adjustable plate between positions without rotation, a blind shoulder defined at the end of at least one of said grooves for contact with the land mating therewith to act as a positive stop for said adjustable plate in its extended position,
 (g) means for establishing external electrical connection to said stator plate,
 (h) means for establishing external electrical connection to said adjustable capacitor plate.

7. Adjustable capacitor according to claim 6 in which (b), (c) and (e) are cylindrically shaped.

8. Adjustable capacitor according to claim 6 in which said drive screw is rotatably captured in the end of said bushing and is provided with a head externally accessible from the end of said bushing.

9. Adjustable capacitor according to claim 8 in which said drive screw has an enlarged flange, and including a sealing ring surrounding said flange.

10. Adjustable capacitor according to claim 9 including a spring washer in contact with said enlarged flange in said housing, said spring washer having spring contact arms extending in spring contact with the inner wall of said bushing and outer wall of said adjustable capacitor plate.

11. Adjustable capacitor according to claim 10 including a washer in contact with the outer face of said enlarged flange and in which the end of said bushing is turned over in contact with said last mentioned washer to capture said drive screw.

12. Adjustable capacitor according to claim 11 in which said stator plate has a base portion forming the end of said housing and a central pin provided with a plastic guide spacer for said adjustable plate.

13. Adjustable capacitor according to claim 12, in which said stator plate and adjustable plate are die-cast metal plates.

14. Adjustable capacitor according to claim 6 in which said drive screw is rotatably captured in the end of said bushing with its head externally accessible therefrom and including sealing means forming a rotatable seal between said bushing.

15. Adjustable capacitor according to claim 6 in which at least one of said plates has a dielectric coating.

16. Adjustable capacitor comprising a tubular housing having a stator capacitor plate positioned therein, a bushing forming an extension of said tubular housing, a drive screw rotatably extending into the interior of said bushing, an adjustable capacitor plate positioned in said bushing in threaded engagement with said drive screw and movable between a retracted position in said bushing and an extended position in said housing nested with said stator capacitor plate with a dielectric air gap therebetween, mating guide means connected to said bushing and adjustable capacitor plate allowing sliding of said adjustable capacitor plate between said positions without rotation, a spring washer in said bushing with contact arms extending in contact with said adjustable capacitor plate to establish an electrical connection between said adjustable capacitor plate and said bushing, means for establishing external electrical connection to said stator, and means for externally rotating said drive screw to thereby slide said adjustable plate relative to said stator plate without rotation to thereby vary the capacitance therebetween.

17. Adjustable capacitor according to claim 16, in which said stator capacitor plate comprises a plurality of concentric tubular plates and in which said adjustable capacitor plate comprises a plurality of concentric tubular plates concentrically slidable between said stator capacitor plates in spaced relationship thereto.

18. Adjustable capacitor according to claim 16, in which said guide means comprises mating guide slots and rib extension.

19. Adjustable capacitor comprising:
 (a) a tubular housing having a wall portion of electric insulating material,
 (b) a stator capacitor plate in the form of a plurality of concentric tubular members positioned in said housing,
 (c) a tubular bushing forming an extension of said housing,
 (d) a drive screw extending centrally axially into the interior of said bushing and rotatably externally therefrom,
 (e) an adjustable capacitor plate in the form of a plurality of concentric tubular members positioned in said bushing in threaded engagement with said drive screw for sliding actuation upon rotation of said drive screw between a retracted position in said bushing and an extended position in said housing nested with said stator plate with its tubular members in alternate spaced concentric relationship to the tubular members forming said stator plate,
 (f) guide means in said bushing allowing sliding of said adjustable plate between said positions without rotation,
 (g) means for establishing external electrical connection to said stator plate,
 (h) a spring washer in said bushing with contact arms extending in contact with said adjustable capacitor plate to thereby establish electrical contact between said bushing and said plate.

References Cited

UNITED STATES PATENTS

| 1,625,330 | 4/1927 | Pinkus | 317—251 |
| 1,735,889 | 11/1929 | Blough | 317—251 |
| 3,239,730 | 3/1966 | Farago | 317—249 |
| 3,336,515 | 8/1967 | Seiden et al. | 317—251 |
| 3,360,697 | 12/1967 | Seiden. | |

ELLIOT A. GOLDBERG, Primary Examiner

U.S. Cl. X.R.

317—249